(12) United States Patent
Hirayama

(10) Patent No.: US 6,530,670 B2
(45) Date of Patent: Mar. 11, 2003

(54) PLANAR ILLUMINATION DEVICE

(75) Inventor: Yoshinobu Hirayama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/984,305

(22) Filed: Oct. 29, 2001

(65) Prior Publication Data

US 2002/0054489 A1 May 9, 2002

(30) Foreign Application Priority Data

Nov. 6, 2000 (JP) .......................................... 2000-336828
Aug. 7, 2001 (JP) .......................................... 2001-239445

(51) Int. Cl.⁷ ............................................... F21V 7/09
(52) U.S. Cl. ............................. 362/31; 362/323; 349/65
(58) Field of Search .......................... 362/31, 235, 323, 362/341, 26, 27; 385/146; 349/65

(56) References Cited

U.S. PATENT DOCUMENTS 5,947,578 A * 9/1999 Ayres .......................... 362/255
6,254,245 B1 * 7/2001 Uehara ........................ 349/65
6,339,418 B1 * 1/2002 Kitagawa .................... 345/102

FOREIGN PATENT DOCUMENTS

| JP | A8-82714 | 3/1996 |
| JP | A11-24585 | 1/1999 |

* cited by examiner

Primary Examiner—Sandra O'Shea
Assistant Examiner—John Amarantides
(74) Attorney, Agent, or Firm—Birch, Stewart, Kolasch & Birch, LLP

(57) ABSTRACT

A planar illumination device has a light source that shines light into a light guide plate through one side face (i) thereof and a reflector member laid on the back face of the light guide plate opposite to the light emission face thereof. In the vicinity of another side face (ii) of the light guide plate opposite to the side face (i) thereof through which the light is shone into the light guide plate, a slit is formed so as to extend along that side face (ii). A portion of the reflector member is, by being bent into an L shape, formed into an insertion portion, and this insertion portion is inserted into the slit.

5 Claims, 5 Drawing Sheets

PLANAR ILLUMINATION DEVICE

BACKGROUND OF THE INVENTION

1. Field of the Invention

The present invention relates to a planar illumination device, and more particularly to a planar illumination device for use as a backlight fitted on the back face of, for example, a liquid crystal display device.

2. Description of the Prior Art

In recent years, in the middle of a so-called IT (information technology) revolution, as dramatic developments are made in information communication fields, more and more stress has come to be placed on the portability of information terminal devices such as cellular telephones and personal computers. In keeping with this trend, also in liquid crystal display devices, more and more stress has come to be put on weight saving, thickness reduction, power saving, high and uniform brightness, and cost saving. This is true also with planar illumination devices such as backlights fitted on the back face of liquid crystal display devices.

First, as a conventional example, the planar illumination device disclosed in Japanese Patent Application Laid-Open No. H8-82714 will be described with reference to FIGS. 7A and 7B. A light source 12 is arranged along one side face of a light guide plate 11 having light-scattering particles dispersed in a transparent resin plate. Around the light source 12 is provided a lamp reflector 13 that reflects the light from the light source 12 and directs it into the light guide plate 11. Behind the light guide plate 11 is arranged a reflector plate 14 that scatteringly reflects light, and on the side faces of the light guide plate 11 other than that along which the light source 12 is provided are provided total-reflection members 15.

In this planar illumination device structured as described above, when the light source 12 is lit, the light therefrom is reflected by the lamp reflector 13 so as to enter the light guide plate 11, and is then uniformly reflected by the total-reflection members 15 at the side faces of the light guide plate 11. The light is then scatteringly reflected by the reflector plate 14, and this causes the top face of the light guide plate 11 to emit light. In this way, uniform light emission intensity is obtained within the light emission face 11c.

Next, as another conventional example, the planar illumination device disclosed in Japanese Patent Application Laid-Open No. H11-24585 will be described with reference to FIG. 8. A light guide plate 21 and a fluorescent lamp 22 arranged along one side face of the light guide plate 21 are housed inside a case 23 that has an opening formed in the portion thereof facing the light emission face 21c of the light guide plate 21 and that has its inner surfaces so formed as to reflect light. Here, the light guide plate 21 is so processed that uniform brightness is obtained over its light emission face 21c.

In this planar illumination device structured as described above, when the fluorescent lamp 22 is lit, the light therefrom is reflected by the case 23 so as to enter the light guide plate 21 from all directions through its side and bottom faces. Thus, the light is uniformly scattered, and this causes the top face of the light guide plate 21 to emit light. In this way, uniform light emission intensity is obtained within the light emission face 21c.

However, the planar illumination device disclosed in Japanese Patent Application Laid-Open No. H8-82714 mentioned above requires additional provision of the total-reflection members 15 on the side faces of the light guide plate 11. This not only increases the total number of components, but also complicates the manufacturing process and thus increases the cost in cases where the light guide plate 11 is thin, because then the total-reflection members 15 need to be bonded thereto with an adhesive layer or the like interposed in between.

On the other hand, the planar illumination device disclosed in Japanese Patent Application Laid-Open No. H11-24585 mentioned above requires special processing of the light guide plate 21, such as dispersing light scattering particles therein, for the purpose of obtaining uniform brightness over the light emission face 21c thereof This, also, hampers cost reduction. Moreover, uses of this planar illumination device are limited by the fact that it has the case 23 outside.

SUMMARY OF THE INVENTION

An object of the present invention is to provide a highly versatile planar illumination device that offers uniform light emission intensity over its light emission face and that simultaneously permits further cost reduction.

To achieve the above object, according to one aspect of the present invention, a planar illumination device is provided with a light source that shines light into a light guide plate through at least one side face (i) thereof and a reflector member laid on the back face of the light guide plate opposite to the light emission face thereof Here, in the vicinity of at least one side face (ii) of the light guide plate other than the side face (i) thereof through which the light is shone into the light guide plate, a slit is formed so as to extend along that side face (ii). Moreover, a portion of the reflector member is, by being bent into an L shape, formed into an insertion portion, and this insertion portion is inserted into the slit.

In this arrangement, the insertion portion inserted into the slit functions as a reflector member at the side face (ii) of the light guide plate. Thus, the light emitted from the light source and shone into the light guide plate is first reflected by the insertion portion at the side face (ii), and is then reflected by the reflector member so as to travel from bottom to top, causing the entire light emission face to emit light with uniform light emission intensity.

The reflector member may have intermittent grooves formed therein to ease the bending of the insertion portion. This permits the insertion portion to be formed with ease and accuracy simply be being bent along the intermittent grooves.

According to another aspect of the present invention, a planar illumination device is provided with a light source that shines light into a light guide plate through one side face (i) thereof and a reflector member laid on the back face of the light guide plate opposite to the light emission face thereof Here, in the vicinity of another side face (ii) of the light guide plate opposite to the side face (i) thereof through which the light is shone into the light guide plate, a slit is formed so as to extend along that side face (ii). Moreover, a portion of the reflector member is, by being bent into an L shape, formed into an insertion portion, and this insertion portion is inserted into the slit.

In this arrangement, the insertion portion inserted into the slit functions as a reflector member at the side face (ii) of the light guide plate. Thus, the light emitted from the light source and shone into the light guide plate is first reflected by the insertion portion at the side face (ii), and is then reflected by the reflector member so as to travel from bottom to top, causing the entire light emission face to emit light with uniform light emission intensity.

The reflector member used in the present invention may be of any type as long as it reflects light. That is, an appropriate type of reflector member is selected so that it permits light to enter the light guide plate with optimum efficiency. For example, depending on whether the light source has directivity or not, an irregular-reflection member is used with a directional light source, and a regular-reflection member is used with a non-directional light source.

Moreover, in the present invention, as the light guide plate, a plate made of transparent resin is suitably used. For example, from among plates made of transparent resin such as acrylic resin, polycarbonate resin, or polyvinyl chloride resin, an appropriate one is selected to suit the intended use.

Moreover, to obtain as uniform brightness as possible within the light emission face of the light guide plate, any conventionally known method may be used, such as molding the light guide plate out of transparent resin and printing dots on the back face thereof opposite to the light emission face, or molding the light guide plate out of transparent resin and forming a large number of grooves or surface irregularities on the back face thereof opposite to the light emission face, or forming the light guide plate out of a light-scattering plate having light-scattering particles dispersed in transparent resin, or molding the light guide plate in the shape of a wedge having decreasing thicknesses from one side face, through which light is shone into it, to the opposite side face.

Moreover, the light source used in the present invention may be of any type. For example, an LED (light-emitting diode) or the like can be used.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1A:
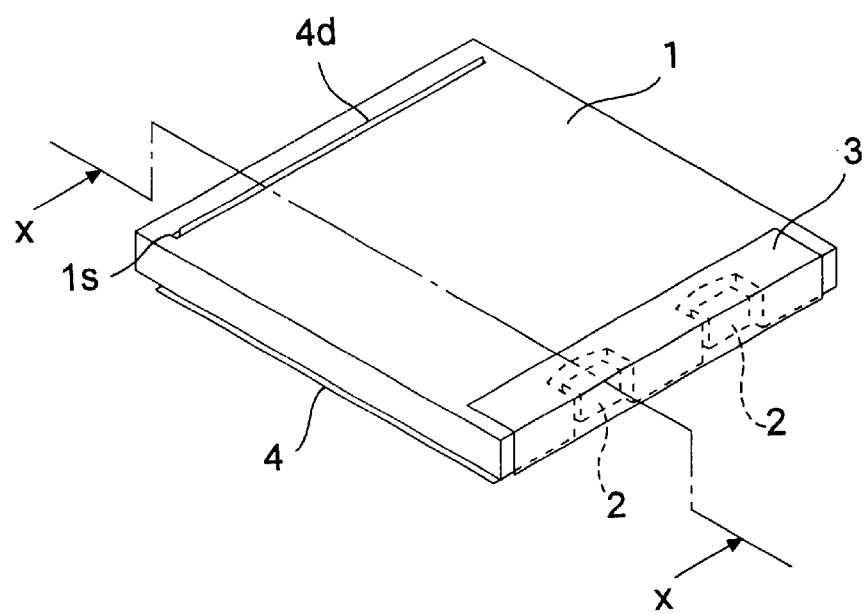
FIG. 1A is a perspective view of the planar illumination device of a first embodiment of the invention.
Figure 1B:
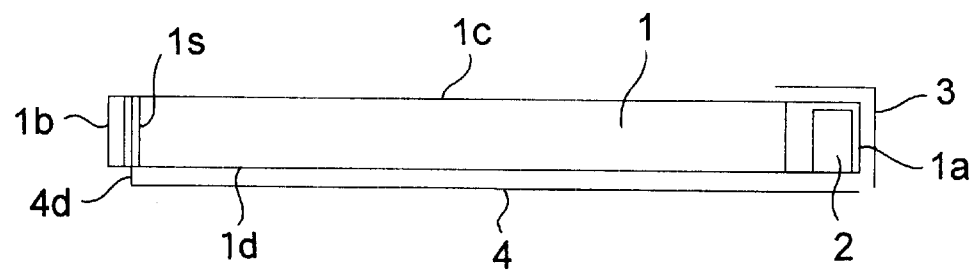
FIG. 1B is a sectional view of the planar illumination device shown in FIG. 1A, taken along line x—x.

FIGS. 1A and 1B are a perspective view and a sectional view along line x—x, respectively, of the planar illumination device of a first embodiment of the invention. A light guide plate 1 has two cut-out portions formed in one side face 1a thereof, and in these cut-out portions are provided light sources 2 employing LEDs. In the vicinity of another side face 1b opposite to the side face 1a, a slit 1s having a substantially rectangular shape is formed so as to extend along the side face 1b.

Moreover, a reflector member 3 is provided that is bent into an L shape so as to cover the side face 1a and part of the light emission face 1c of the light guide plate 1, so that the light from the light sources 2 is reflected by the reflector member 3 and is thereby efficiently directed into the light guide plate 1. Here, the length of the portion of the reflector member 3 that covers the light emission face 1c is so determined that that portion at least hides the light sources 2 embedded in the light guide plate 1. Thus, the light from the light sources 2 is shut off by the reflector member 3 so that no portion of the light emission face 1c is extremely bright due to light that has not entered the light guide plate 1.

Figure 2A:
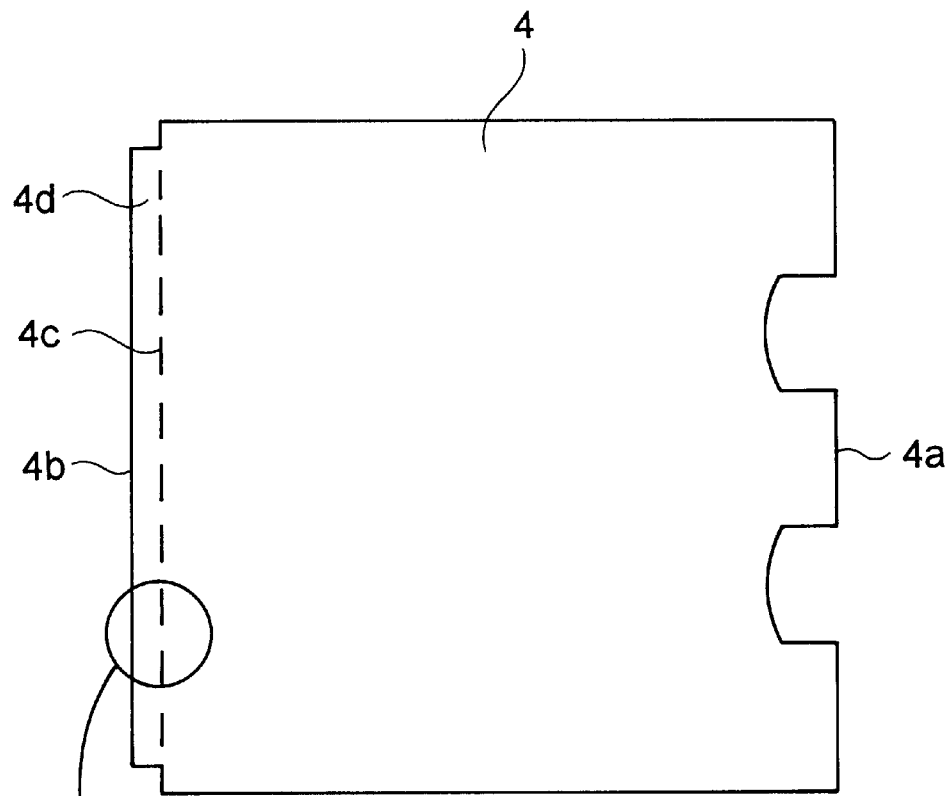
FIG. 2A is a plan view of the reflector member arranged on the back face of the light guide plate opposite to the light emission face thereof.

Moreover, as FIG. 2A shows, on the back face 1d of the light guide plate 1 opposite to the light emission face 1c, a sheet-type reflector member 4 is provided that has cut-out portions formed in one side 4a thereof in shapes corresponding to those of the light sources 2 (see FIGS. 1A and 1B). In this reflector member 4, intermittent grooves 4c are formed along the opposite side 4b thereof, 1.4 mm away from the edge. These intermittent grooves 4c permit the reflector member 4 to be bent along them into an L shape so that an outer edge portion of the reflector member 4 is formed into an insertion portion 4d. This insertion portion 4d is inserted into the slit 1s (see FIGS. 1A and 1B). It is to be understood that the intermittent grooves 4c may be formed in any other manner as long as they permit easy formation of the insertion portion 4d; for example, they may be a series of slit-like perforations (elongate through holes).

Thus, to keep the reflector member 4 in intimate contact with the light guide plate 1, there is no need, for example, to bond them together with adhesive applied to the side face of the light guide plate 1, or to form a metal layer, such as a silver or aluminum layer, on the side face of the light guide plate 1 by vacuum deposition or the like. The bent shape (the insertion portion 4d) of the reflector member 4 itself serves to reflect back light that attempts to go out of the light guide plate 1 sideward. This helps reduce the number of components and simplify the manufacturing process. In this way, it is possible to produce at low cost a planar illumination device with a high- and uniform-brightness light emission face 1c. It is to be noted that it is not always necessary to interpose a layer of air between the side face of the light guide plate 1 and the reflector member 4.

The reflector member 4 used in this embodiment is preferably formed out of a material that exhibits high reflectivity to visible light. A suitable example of such a material is polyethylene terephthalate (PET)-based resin incorporated with white $TiO_2$ or the like so as to reflect light. Specifically, in this embodiment, an irregular-reflection member is used that exhibits 86% reflectivity to light having a wavelength of 600 nm.

Figure 2B:
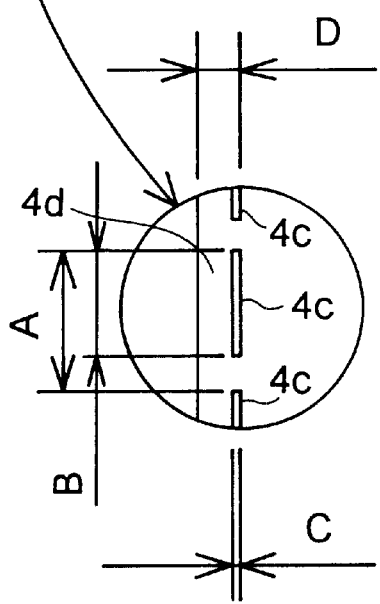
FIG. 2B is an enlarged view of a part of the reflector member shown in FIG. 2A.

FIG. 2B is an enlarged view of part of the intermittent grooves 4c described above. In this figure, A represents the pitch of the intermittent grooves 4c, B represents the cut length thereof, C represents the cut width thereof, and D represents the bent width of the insertion portion 4d. The pitch A, the cut length B, and the cut width C are determined according to the thickness and hardness of the material of the reflector member 4, and the bent width D is determined according to the depth of the slit 1s of the light guide plate 1 and the workability of the bending.

For example, PET, one of materials for the reflector member 4, is a relatively hard resin, and therefore, when the intermittent grooves 4c described above were formed with the ratio A:B=3:2, the bending of the insertion portion 4d required a relatively strong force, making the bending difficult. To overcome this, then, with the pitch A kept constant, the intermittent grooves 4c were formed with the ratio A:B=5:4, i.e. with a longer cut length B so that the intermittent grooves 4c occupy a larger proportion. This made the bending easier. The bent width D was 1.4 mm.

Figure 3:
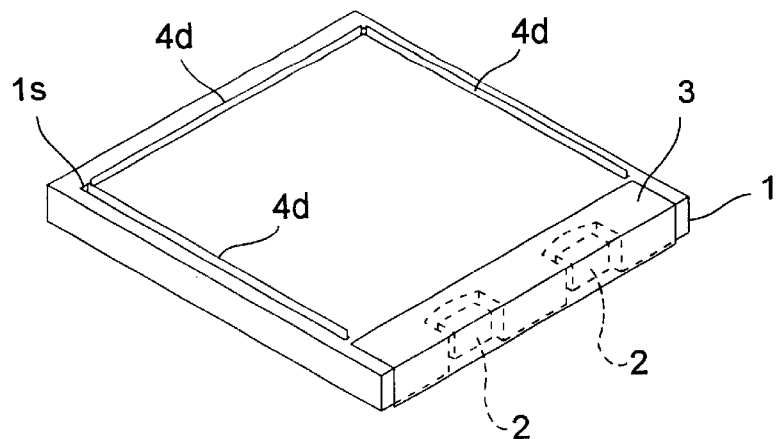
FIG. 3 is a perspective view of another example of the planar illumination device of the first embodiment.
Figure 4:
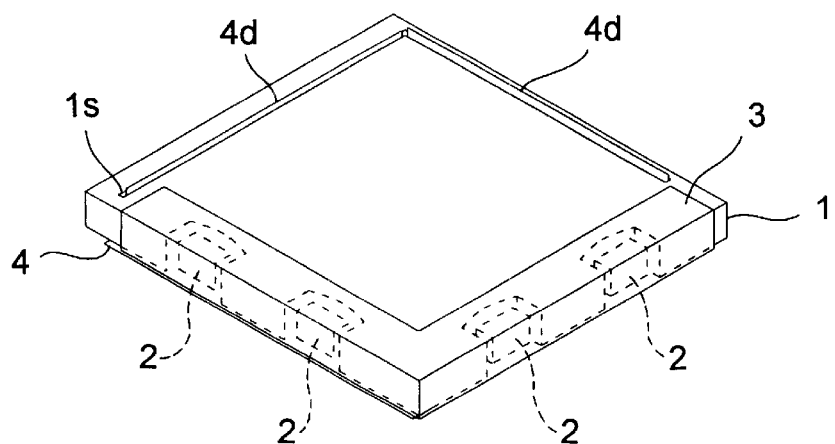
FIG. 4 is a perspective view of still another example of the planar illumination device of the first embodiment.
Figure 5:
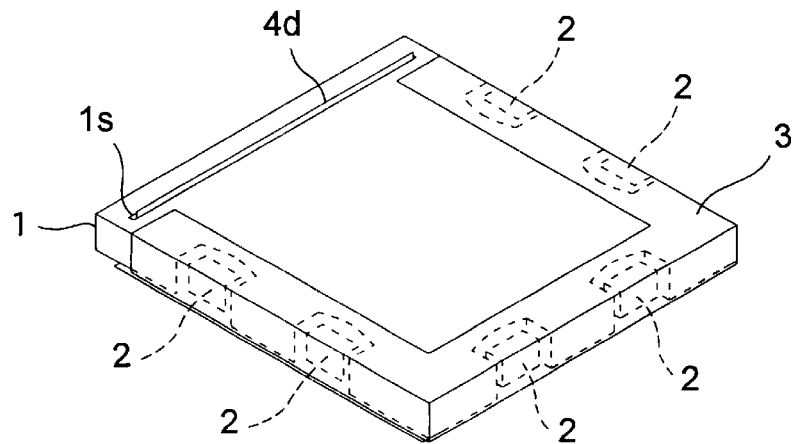
FIG. 5 is a perspective view of a further example of the planar illumination device of the first embodiment.

FIGS. 3 to 5 show modified examples of this embodiment. In the planar illumination device shown in FIG. 3, the light sources 2 are provided only in one side face 1a (see FIG. 1B) of the light guide plate 1 just as described above. However, the slit 1s is formed in a C shape along all the side faces of the light guide plate 1 other than that through which light is shone into it. Correspondingly, the intermittent grooves 4c similar to those shown in FIG. 2A are formed along those edges of the reflector member 4 which correspond to those side faces of the light guide plate 1 along which the slit 1s is formed. The reflector member 4 is bent along these intermittent grooves 4c to form insertion portions 4d, which are inserted into the slit 1s. In this arrangement, the light from the light sources 2 which has entered the light guide plate 1 is reflected from all around the light guide plate 1. This contributes to a higher degree of uniformity in light emission intensity on the light emission face 1c.

In the planar illumination device shown in FIG. 4, the light sources 2 are provided in two adjacent side faces of the light guide plate 1, in an L-shaped arrangement. The slit 1s is formed in an L shape along all the side faces of the light guide plate 1 other than those through which light is shone into it. Correspondingly, the intermittent grooves 4c similar to those shown in FIG. 2A are formed along those edges of the reflector member 4 which correspond to those side faces of the light guide plate 1 along which the slit 1s is formed. The reflector member 4 is bent along these intermittent grooves 4c to form insertion portions 4d, which are inserted into the slit 1s. In this arrangement, as compared with arrangements in which the light sources 2 are provided only in one side face 1a (see FIG. 1B) of the light guide plate 1, it is possible to achieve significantly higher, and uniform, light emission intensity on the light emission face 1c.

In the planar illumination device shown in FIG. 5, the light sources 2 are provided in three adjacent side faces of the light guide plate 1, in a C-shaped arrangement. The slit 1s is formed along one side face of the light guide plate 1 other than those through which light is shone into it. Correspondingly, the intermittent grooves 4c similar to those shown in FIG. 2A are formed along that edge of the reflector member 4 which corresponds to that side face of the light guide plate 1 along which the slit 1s is formed. The reflector member 4 is bent along these intermittent grooves 4c to form an insertion portion 4d, which is inserted into the slit 1s. In this arrangement, as compared with arrangements in which the light sources 2 are provided only in one side face 1a (see FIG. 1B) of the light guide plate 1, it is possible to achieve significantly higher, and uniform, light emission intensity on the light emission face 1c.

Figure 6A:
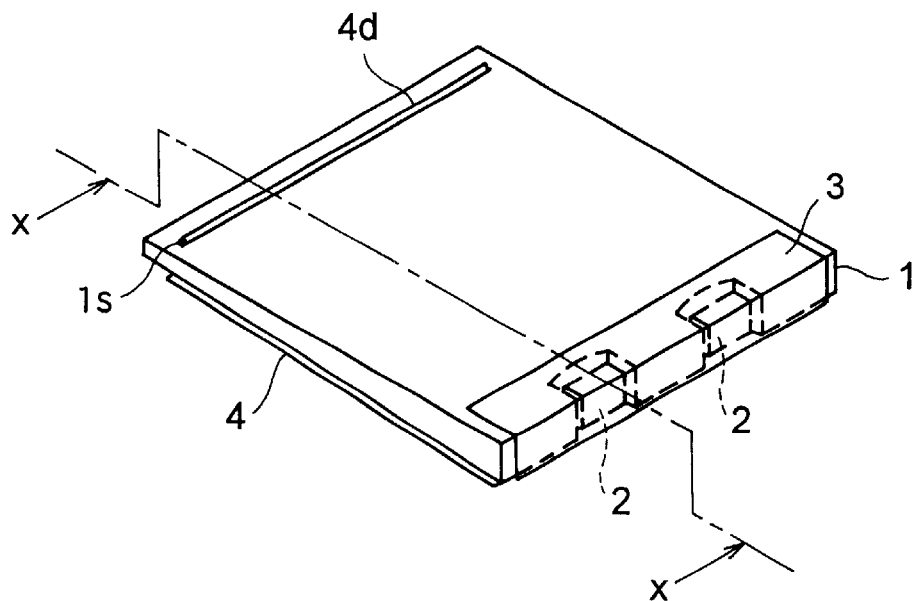
FIG. 6A is a perspective view of the planar illumination device of a second embodiment of the invention.
Figure 6B:
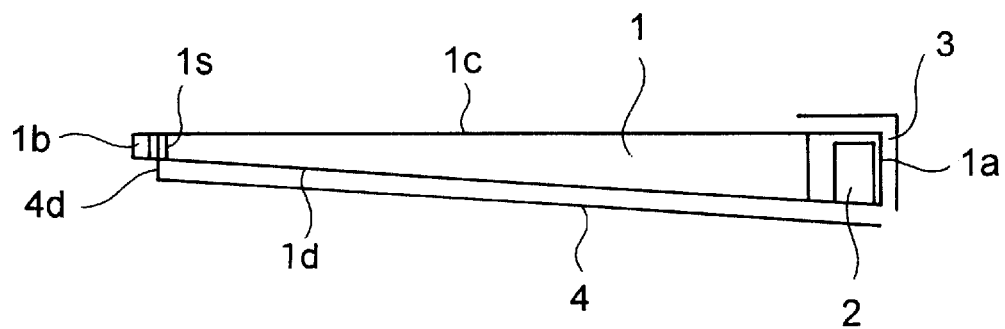
FIG. 6B is a sectional view of the conventional planar illumination device shown in FIG. 6A, taken along line x—x.
Figure 7A:
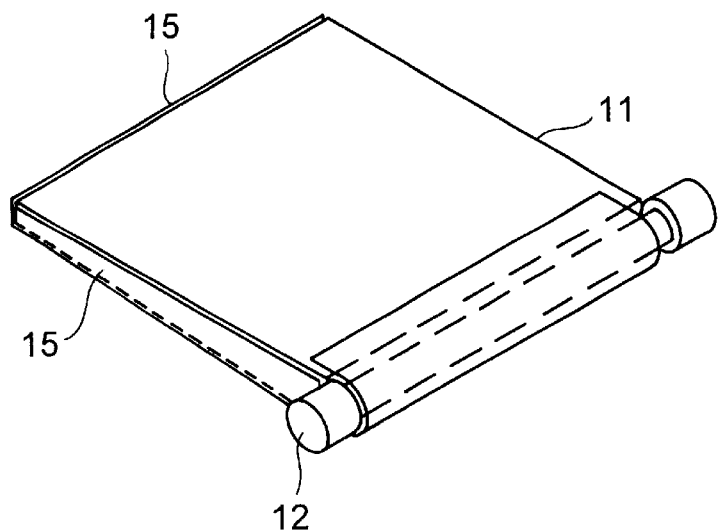
FIG. 7A is a perspective view of an example of a conventional planar illumination device.
Figure 7B:
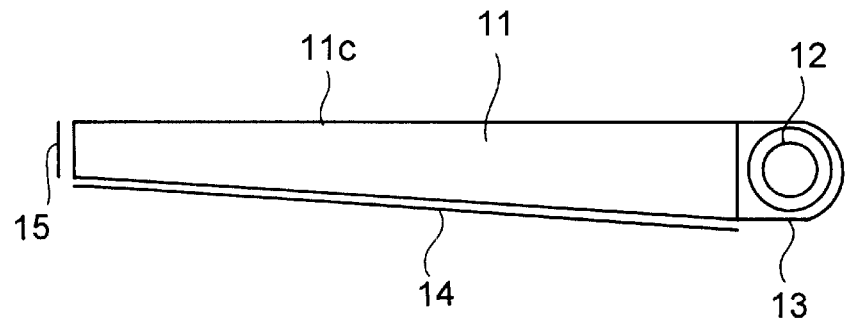
FIG. 7B is a side sectional view of the planar illumination device shown in FIG. 7A.
Figure 8:
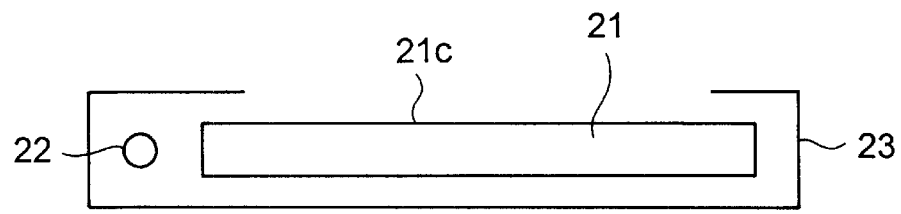
FIG. 8 is a schematic side sectional view of another example of a conventional planar illumination device.

FIGS. 6A and 6B are a perspective view and a sectional view taken along line x—x, respectively, of the planar illumination device of a second embodiment of the invention. In these figures, such members as have the same names as in the first embodiment shown in FIGS. 1A and 1B and described above are identified with the same reference numerals, and their detailed explanations will not be repeated.

The distinctive feature of this embodiment is that, as FIGS. 6A and 6B show, the light guide plate 1 is formed in the shape of a wedge so as to have decreasing thicknesses from one side face 1a thereof, through which the light from the light sources 2 is shone into it, to the opposite side face 1b. As a result, in addition to the effects achieved in the first embodiment described above, it is possible to achieve still higher brightness and a still higher degree of uniformity in light emission intensity on the light emission face 1c, thanks to the effects that are known to be characteristic of a light guide plate 1 having such a shape.

As described above, according to the present invention, in a light guide plate, a slit is formed so as to extend along at least one side face of the light guide plate other than that through which the light from a light source is shone into it. Moreover, a reflector member is so bent that an edge portion thereof is formed into an insertion portion that is inserted into the slit. As a result, it is possible to use only one reflector member instead of two conventionally used. In addition, it is possible to eliminate the need to fix the reflector member as by bonding. In this way, it is possible to reduce the number of components and simplify the manufacturing process, and thereby realize at low cost a planar illumination device with high- and uniform-brightness light emission face.

Moreover, intermittent grooves may be formed in the reflector member so that the insertion portion can be formed by bending the reflector member along the intermittent grooves. This permits the insertion portion to be formed easily and accurately, and thus helps reduce variations in the quality of the planar illumination device.

Furthermore, the light guide plate may be so formed as to have decreasing thicknesses from one side face thereof, through which the light from the light source is shone into it, to the opposite side face. This makes it possible to achieve even higher brightness and an even higher degree of uniformity in light emission intensity on the light emission face, thanks to the effects known to be characteristic of a light guide plate having such a shape.

What is claimed is:

1. A planar illumination device comprising a light source that shines light into a light guide plate through at least one side face (i) thereof and a reflector member laid on a back face of the light guide plate opposite to a light emission face thereof, wherein, in vicinity of at least one another side face (ii) of the light guide plate other than the one side face (i) thereof through which the light is shone into the light guide plate, a slit is formed so as to extend parallel along said at least one another side face (ii), and a portion of the reflector member is, by being bent into an L shape, formed into an insertion portion so that this insertion portion is inserted into the slit.

2. A planar illumination device as claimed in claim 1,
wherein the reflector member has intermittent grooves formed therein to ease the bending of the insertion portion.

3. A planar illumination device comprising a light source that shines light into a light guide plate through one side face (i) thereof and a reflector member laid on a back face of the light guide plate opposite to a light emission face thereof,
wherein, in vicinity of another side face (ii) of the light guide plate opposite to the one side face (i) thereof through which the light is shone into the light guide plate, a slit is formed so as to extend parallel along said another side face (ii), and a portion of the reflector member is, by being bent into an L shape, formed into an insertion portion so that this insertion portion is inserted into the slit.

4. A planar illumination device as claimed in claim 3,
wherein the reflector member has intermittent grooves formed therein to ease the bending of the insertion portion.

5. A planar illumination device as claimed in claim 3,
wherein the light guide plate is shaped like a wedge so as to have decreasing thicknesses from the side face (i) to the side face (ii) thereof.

\* \* \* \* \*